J. CHRISTY.
WHEEL TIRE.
APPLICATION FILED NOV. 12, 1907.
914,551.
Patented Mar. 9, 1909.
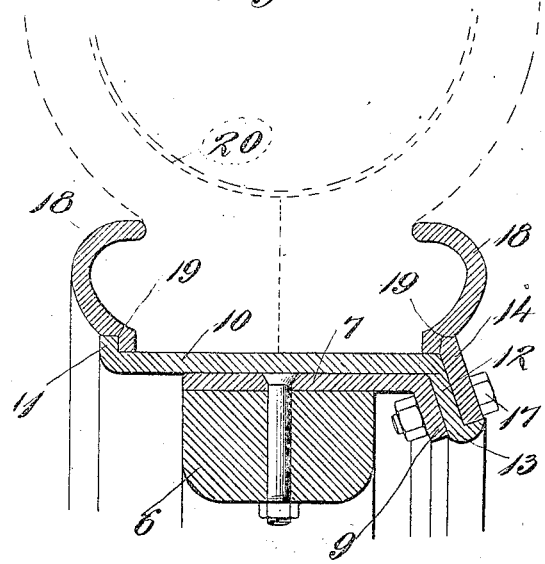
Fig. 1.
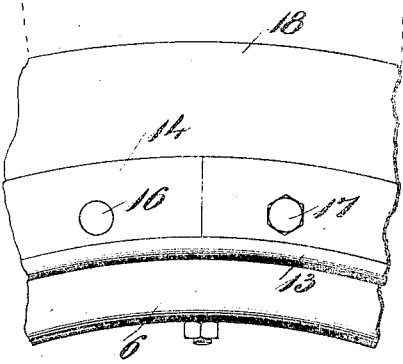
Fig. 2.
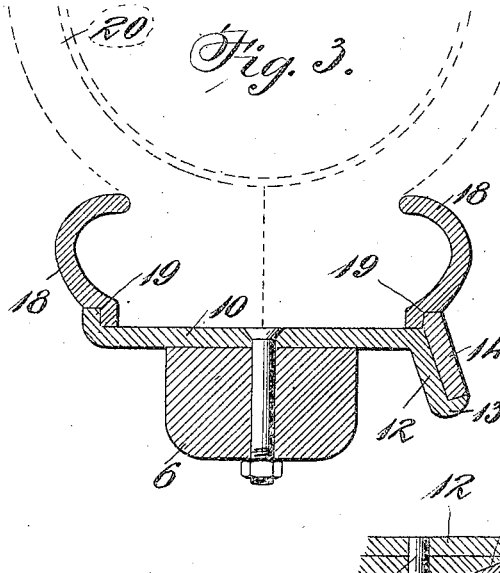
Fig. 3.
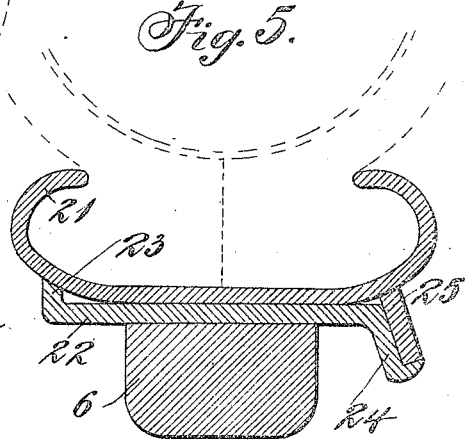
Fig. 5.
Fig. 4.
Witnesses
Inventor
James Christy,
By
Attorneys

UNITED STATES PATENT OFFICE.

JAMES CHRISTY, OF AKRON, OHIO.

WHEEL-TIRE.

No. 914,551.

Specification of Letters Patent.

Patented March 9, 1909.

Application filed November 12, 1907. Serial No. 401,840.

*To all whom it may concern:*

Be it known that I, JAMES CHRISTY, a citizen of the United States, residing at Akron, in the county of Summit and State of Ohio, have invented certain new and useful Improvements in Wheel-Tires, of which the following is a specification.

This invention relates to fastening devices for pneumatic or other similar tires, and has for its object to provide an improved construction which will permit the tire and rim to be placed or removed as a whole, without deflating the tire or detaching the same from the rim.
The invention will be found particularly useful in connection with automobiles, the intent being to carry an extra tire and rim, with the tire inflated, so that in case of puncture of one of the tires, it can be removed and the extra tire substituted with a delay of a few minutes only.

A further object of the invention is to provide improved means for holding the retaining rings, which engage the base of the tire, on the rim, and in such manner that they can be quickly removed if and when desired.

The invention is illustrated in the accompanying drawings, in which—
Figure 1 is a sectional view showing the tire. Fig. 2 is a side elevation of a portion thereof. Fig. 3 is a sectional view of a modification. Fig. 4 is a longitudinal section showing the manner of attaching the split retaining ring to the rim and fastening the same together. Fig. 5 is a sectional view of another modification.

Referring specifically to the drawings, the felly of the wheel is indicated at 6 and has thereon an inner band or rim 7. This may be bolted on the felly or fastened thereto in any other suitable manner. At one edge it projects laterally beyond the side of the felly, and has a downwardly or inwardly extending flange 9 which extends at an angle to and is spaced from the side of the felly. This rim is comparatively permanent and is intended to remain on the felly.

10 indicates an outer or secondary rim which is of proper size and diameter to fit over the inner rim 7, at a snug fit. It has at one edge an outwardly extending flange 11, and at the other edge it has an inclined inwardly extending flange 12 which fits snugly against the flange 9. At the outer edge of the flange 12 is an upturned lip 13, forming a V-shaped groove with the flange 12, and said groove forms a seat for the inner edge of the retaining ring 14. Said retaining ring is split and scarfed at one place, as shown at 15, and is of proper size to extend around and rest upon the lip, lying with its side against the flange 12. When the ends of the ring are drawn together its inner edge fits within the groove behind the lip 13, which thus holds the ring in place. One end of the ring 14 is attached to the adjacent flange of the rim by a lug 16, and the other end is held by a bolt 17 which extends through the ring and through the flange of the rim. Instead of the bolt 17 a screw may be used as shown in Fig. 4. The bolt or screw extends through the flange of one or both rims, according to whether one rim is used, as in Fig. 3, or the double rim, as in Fig. 1.

The flanges of the tire base are engaged on opposite sides by hooked rings 18, in a manner common with clencher tires, and these rings are rabbeted at their inner edges, as indicated at 19. On one side the rabbet fits over or receives the flange 11 on the rim, and on the other side the rabbet receives the outer edge of the retaining ring 14, which thus holds the parts in place and retains the tire 20 on the rim.

In Fig. 1 the inner and outer or double rim is shown, as above described, and with this construction, by removing the nut on the bolt 17 the outer rim 10 and the tire secured thereto may be bodily dismounted or removed from the wheel, without deflating the tire. And obviously another rim and tire can be as readily substituted. This will allow a very quick change when desired, and it is necessary to loosen only one bolt. However, additional bolts may be provided around the ring if desired or found to be necessary.
In Fig. 3 the simple or single form is shown, the inner rim 7 being omitted and the other parts being similar in all respects to the parts above described. This lacks the feature of permitting the rim and tire to be dismounted without deflation, but includes the retaining devices at the edge of the rim.

In Fig. 5 a modification is shown having a standard or known one-piece clencher rim 21 fitting over an inner rim 22 which is bolted to the felly and which has at one edge a flange 23 projecting outwardly against the outer rim and at the other edge a flange 24 projecting inwardly and supporting a retaining ring 25 in a manner similar to that described above, except that the retaining ring does not project into a groove or rabbet in the outer rim, but bears against the same, in such manner, however, that the outer rim is retained in place on the inner rim, and can be slipped off laterally by removing the retaining ring 25 in the same manner as above indicated with respect to the ring 14.

The invention is capable of modification within the following claims and is therefore not limited to the exact forms shown.

I claim:

1. The combination of a wheel rim having a flat flange at one edge projecting inwardly at an inclination, with a lip at the edge of said flange, a removable ring resting upon the rim and engageable with the base of a tire, a split retaining ring fitting around the lip and resting at an inclination against the flange, and fastenings securing the ends of the retaining ring to the flange.

2. The combination of a felly, a fixed inner rim thereon having an inwardly projecting flange at one edge spaced from the side of the felly, a removable outer rim fitting over the inner rim, and having an outwardly projecting flange at one edge and an inwardly projecting flange at the other edge provided with an outwardly projecting lip at its edge and resting against the flange of the inner rim, tire-holding rings fitting upon the outer rim, a retaining ring resting against the flange and lip of the outer rim and engaging one of the tire holding rings, and fastenings extending through said retaining ring and flanges and terminating in the space between the same and the side of the felly.

3. The combination of a rim having a flat inwardly inclined flange at one edge and a lip at the edge of said flange forming an outwardly presented angular groove, a removable ring mounted upon the said rim and adapted to engage the base of a tire, a split flat retaining ring having a corner fitting in said groove and inclined inwardly against the flange, and having lapped ends, and fastenings between the ends of the ring and the flange.

In testimony whereof I affix my signature, in presence of two witnesses.

JAMES CHRISTY.

Witnesses:
W. F. BOWEN,
M. E. ROBERTS.